US010760978B2

(12) United States Patent
Zhou

(10) Patent No.: US 10,760,978 B2
(45) Date of Patent: *Sep. 1, 2020

(54) TOILET CAPABLE OF MEASURING BODY TEMPERATURE

(71) Applicant: Zhongshan Anbo Health Technology Co., Ltd., Zhongshan (CN)

(72) Inventor: Wenhui Zhou, Zhongshan (CN)

(73) Assignee: ZHONGSHAN ANBO HEALTH TECHNOLOGY CO., LTD., Zhongshan (CN)

( * ) Notice: Subject to any disclaimer, the term of this patent is extended or adjusted under 35 U.S.C. 154(b) by 218 days.

This patent is subject to a terminal disclaimer.

(21) Appl. No.: 15/915,081

(22) Filed: Mar. 8, 2018

(65) Prior Publication Data

US 2019/0277710 A1 Sep. 12, 2019

(51) Int. Cl.
*G01K 13/00* (2006.01)
*A47K 17/02* (2006.01)
*A47K 13/24* (2006.01)
*G06K 9/00* (2006.01)

(52) U.S. Cl.
CPC .......... *G01K 13/002* (2013.01); *A47K 13/24* (2013.01); *A47K 17/026* (2013.01); *G06K 9/00087* (2013.01)

(58) Field of Classification Search
CPC .... G01K 13/002; G01K 13/004; A47K 13/24; A47K 17/026; A47K 13/30; G06K 9/00087
See application file for complete search history.

(56) References Cited

U.S. PATENT DOCUMENTS

| 3,879,769 | A | * | 4/1975 | Slawinski | E03D 9/08 4/447 |
| 4,961,431 | A | * | 10/1990 | Ikenaga | A61B 5/14507 600/573 |
| 5,410,471 | A | * | 4/1995 | Alyfuku | A61B 5/14507 600/300 |
| 8,910,320 | B2 | * | 12/2014 | Stauber | A47K 13/305 4/236 |
| 9,595,185 | B1 | * | 3/2017 | Hall | G01G 23/3735 |
| 2006/0087097 | A1 | * | 4/2006 | Kramer | A47C 7/62 280/304.1 |
| 2008/0060119 | A1 | * | 3/2008 | Pinizzotto | E03D 9/005 4/217 |
| 2009/0025131 | A1 | * | 1/2009 | Yamamoto | A47K 13/305 4/420 |
| 2009/0144891 | A1 | * | 6/2009 | Peng | A61G 7/1007 4/480 |

(Continued)

*Primary Examiner* — Nathaniel T Woodward
*Assistant Examiner* — Philip L Cotey
(74) *Attorney, Agent, or Firm* — Bayramoglu Law Offices LLC

(57) ABSTRACT

A toilet capable of measuring body temperature, includes a toilet base and a machine body connected to the toilet base, wherein the machine body is connected to a toilet seat. The toilet seat is rotatable relative to the machine body and covers the toilet base. A body temperature detection device is provided on the machine body. In the present invention, the combination of human body temperature measurement and the toilet can enable people to measure body temperature while using the toilet. The temperature measurement has the advantages of quick operation, convenience, and being close to life.

14 Claims, 4 Drawing Sheets

(56) References Cited

U.S. PATENT DOCUMENTS

| | | | |
|---|---|---|---|
| 2010/0293705 A1* | 11/2010 | Kim | A47K 17/024 |
| | | | 4/254 |
| 2013/0117920 A1* | 5/2013 | Nishimura | A47K 13/305 |
| | | | 4/237 |
| 2013/0145537 A1* | 6/2013 | Al-Jafar | A61G 5/1002 |
| | | | 4/420.5 |
| 2015/0196178 A1* | 7/2015 | Schottenstein | A47C 7/62 |
| | | | 4/234 |
| 2018/0020984 A1* | 1/2018 | Hall | A61B 5/0059 |
| | | | 600/301 |
| 2018/0078191 A1* | 3/2018 | Hall | G16H 50/30 |
| 2018/0084959 A1* | 3/2018 | Hall | A47K 13/24 |
| 2018/0153362 A1* | 6/2018 | Huang | A47K 13/305 |
| 2018/0153414 A1* | 6/2018 | Hall | A61B 5/01 |
| 2018/0255989 A1* | 9/2018 | Kappeli | A47K 13/302 |
| 2019/0008457 A1* | 1/2019 | Hall | A61B 5/6891 |
| 2019/0063054 A1* | 2/2019 | Luettgen | E03D 9/005 |

\* cited by examiner

TOILET CAPABLE OF MEASURING BODY TEMPERATURE

TECHNICAL FIELD

The present invention relates to a toilet, and more particularly to a toilet capable of measuring body temperature.

BACKGROUND OF THE INVENTION

Body temperature is an important sign of life. However, due to measurement inconvenience, very few people in daily life would intentionally measure body temperature, except for urgent demands. Thus, people cannot monitor their own body temperature every day. Toilets are used basically every day. With the increasing requirements of people for the quality life, the demand for health is getting higher and higher. It is a trend that the personal health care functions are introduced into the smart toilet. A toilet capable of measuring body temperature makes it more convenient for people to know their own body temperatures, so as to win market competition easily.

The present invention has been made based on this situation.

SUMMARY OF THE INVENTION

The objective of the present invention is to overcome the deficiencies of the prior art and provide a toilet having a simple structure and capable of quickly and conveniently measuring the body temperature of a human body.

The present invention is achieved by the following technical solutions:

A toilet capable of measuring body temperature, comprising toilet base 2 and machine body 1 connected to toilet base 2, wherein the machine body 1 is connected to toilet seat 3, and the toilet seat is rotatable relative to the machine body and covers toilet base 2; wherein machine body 1 is provided with body temperature detection device 4.

Body temperature detection device 4 comprises temperature measuring head 41 exposed on machine body 1, wherein control circuit board 42 is electrically connected to temperature measuring head 41.

Machine body 1 comprises backrest 11, wherein each of the two sides of backrest 11 is provided with armrest 12; temperature measuring head 41 is arranged on backrest 11 and/or on an inner side of armrest 12.

Temperature measuring head 41 is a non-contact infrared thermometer or a contact type electronic thermometer.

Armrest 12 is provided with an exposed fingerprint identification window 7 electrically connected to control circuit board 42.

Arc portion 121, for placing a palm, is provided on the front end of armrest 12, and arc portion 121 is provided with concave arc-shaped finger groove 122; a bottom of concave arc-shaped finger groove 122 is provided with exposed hole 1221 which cooperates with fingerprint identification window 7 and exposes fingerprint identification window 7.

Concave arc-shaped finger groove 122 is provided in a front to rear direction.

Armrest 12 is provided with control panel 5, wherein the control panel is electrically connected to control circuit board 42 and is used to display detection data detected by body temperature detection device 4.

A rotating device is provided between armrest 12 and control panel 5, wherein the rotating device is configured to make armrest 12 and control panel 5 rotate, relative to each other, at multiple angles.

The rotating device comprises rotating shaft body 6, the outer side of armrest 12 is provided with rotating groove 123 which is concave and fitted with rotating shaft body 6. A front part and a rear part of rotating groove 123 are each provided with armrest shaft hole 124, rotating shaft body 6 is provided with armrest rotating shaft 61, wherein armrest rotating shaft 61 is fitted with armrest shaft hole 124, so as to make rotating shaft body 6 rotate left and right relatively to armrest 12. The rotating shaft body 6 is further provided with panel rotating shaft 62 perpendicular to armrest rotating shaft 61, control panel 5 is provided with panel shaft hole 51 cooperating with panel rotating shaft 62, so as to make control panel 5 rotate 360 degrees relative to panel rotating shaft 62.

Compared with the prior art, the present invention has the advantages as shown below:

1. The present invention combines body temperature measurement with a toilet, and detects the temperature of a human body by means of a body temperature detection device provided on the machine body, so that people can measure the temperature of the human body while using the toilet. The body temperature measurement is quick, convenient, and can be easily implemented in daily life.

2. As a further improvement of the present invention, the body temperature detection device of the smart toilet of the present invention comprises a temperature measuring head exposed on the machine body. The temperature measuring head is electrically connected to a control circuit board. The machine body comprises a backrest, armrests are arranged on both sides of the backrest, and the temperature measuring head is arranged on the backrest and/or on the inner side of the armrest. When a person sits on the present invention to use the toilet, the human body naturally contacts with or comes close to the backrest and the armrests, so that the body temperature detection device can measure the temperature of the person, and the temperature measurement is quicker and more convenient.

3. As a further improvement of the present invention, the armrest of the smart toilet of the present invention is provided with a fingerprint identification window which is exposed and electrically connected to the control circuit board. The fingerprint identification window 7 is used for collecting and confirming the identity information of the user. The control circuit board is used to record the corresponding user's temperature measurement result, so as to help to manage the temperature information of different users.

4. As a further improvement of the present invention, the armrest is provided with a control panel which is electrically connected to the control circuit board and is capable of displaying the detection data of the body temperature detection device, wherein a rotating device is provided between the armrest and the control panel, so that the armrest and the control panel can rotate relative to each other at multiple angles. The control panel can also be used for controlling the present invention. The user adjusts the angle of the control panel relative to the toilet by the rotating device according to his or her preference, which has the advantage of providing good user experience.

DETAILED DESCRIPTION OF THE INVENTION

Figure 1:
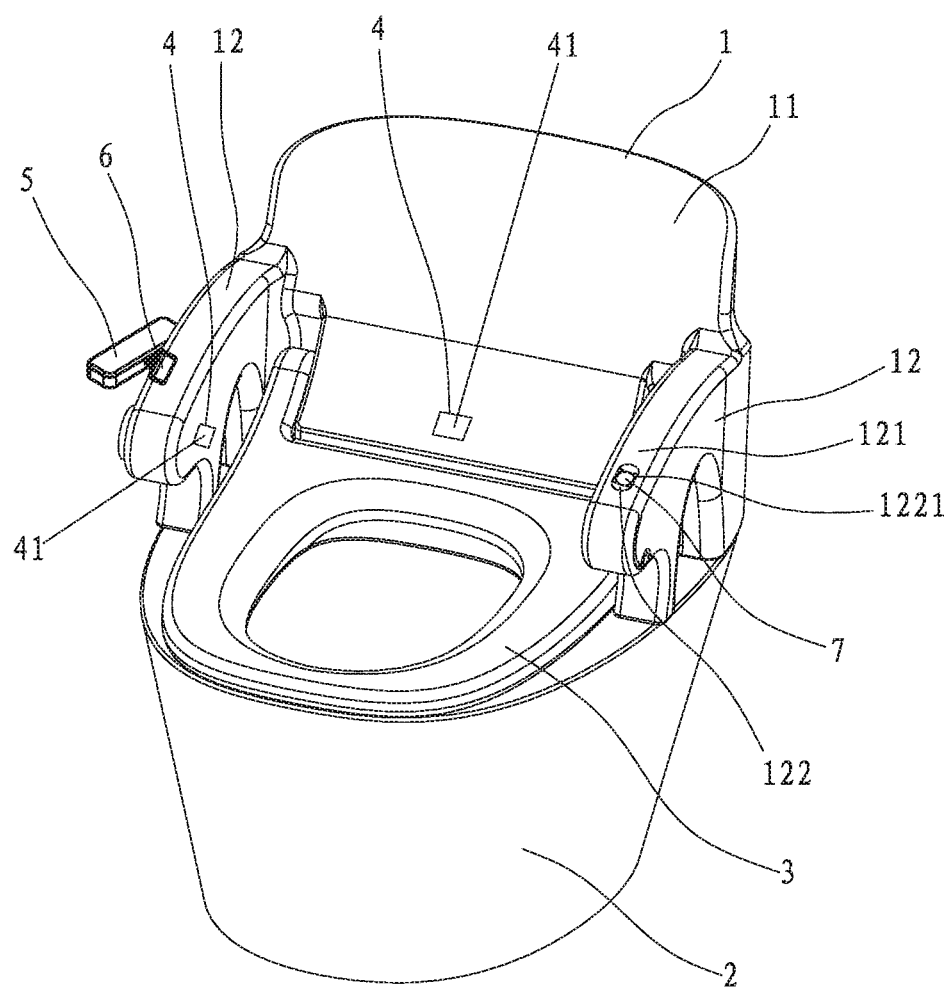
FIG. 1 is a schematic diagram of a toilet capable of measuring body temperature of the present invention.
Figure 2:
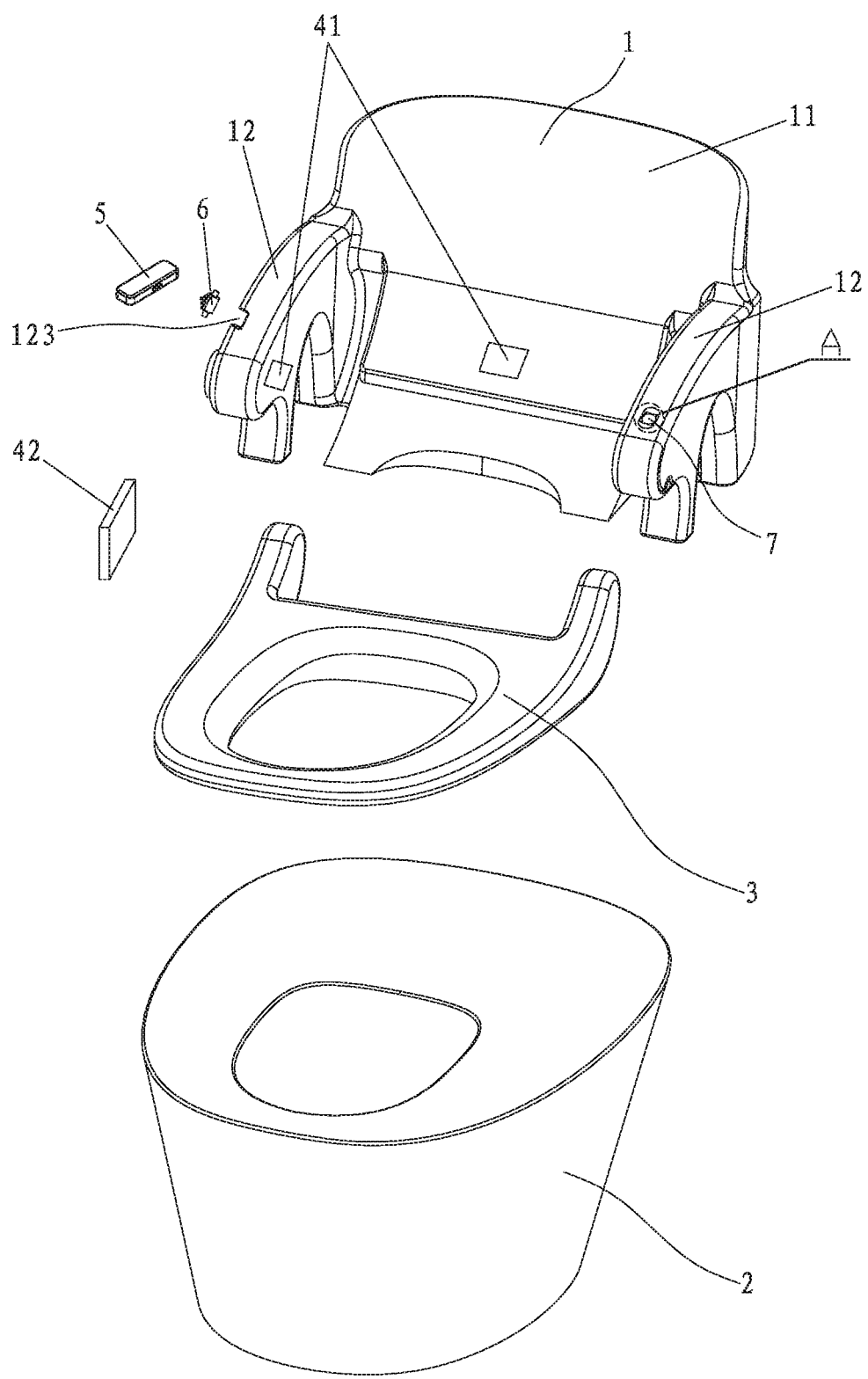
FIG. 2 is an exploded view of the present invention.
Figure 3:
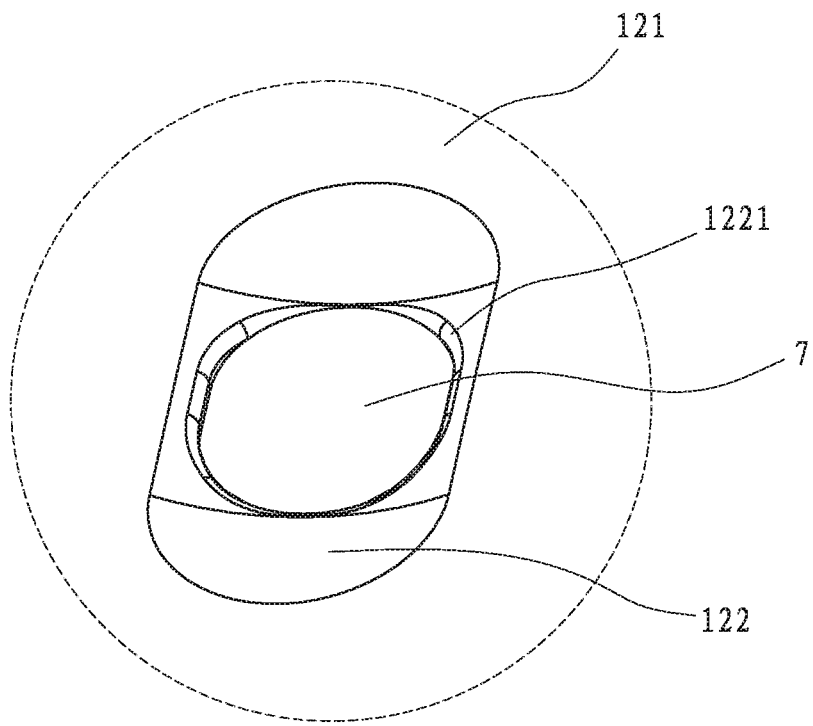
FIG. 3 is a partially enlarged view A in FIG. 2.
Figure 4:
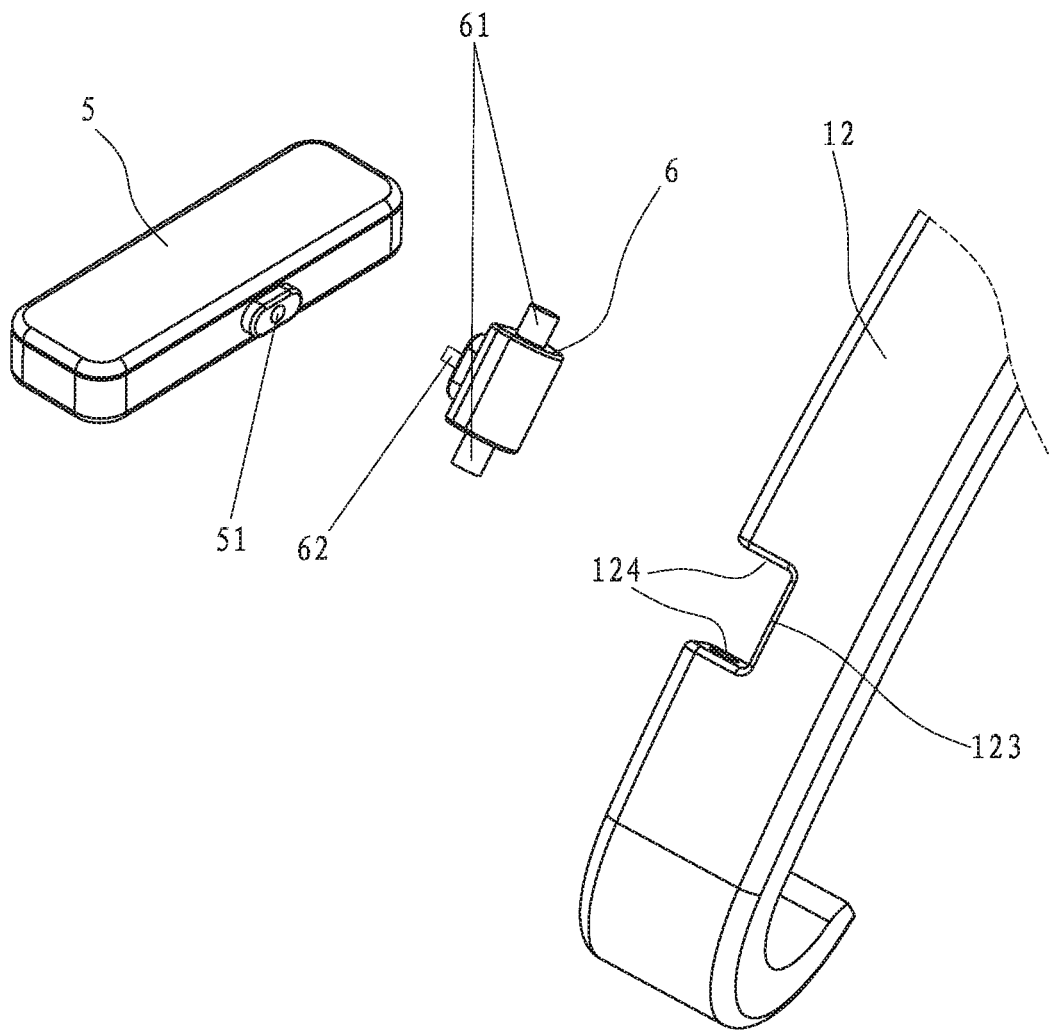
FIG. 4 is a disassembly and assembly schematic diagram of an armrest and a fingerprint identification device.

The present invention will be further described as below with reference to the accompanying drawings:

As shown in FIG. 1 to FIG. 4, a toilet capable of measuring body temperature, comprising toilet base 2 and machine body 1 connected to toilet base 2, wherein machine body 1 is connected to toilet seat 3, and the toilet seat 3 can rotate relative to machine body 1 and covers toilet base 2. Machine body 1 is provided with body temperature detection device 4, so that the body temperature can be measured while the toilet is in use. Generally, the time required for using the toilet takes a few minutes, which can be just used to complete the measurement of body temperature, thus no additional time of the user is wasted. This measurement method is simple and convenient.

Body temperature detection device 4 comprises temperature measuring head 41 exposed on machine body 1, wherein control circuit board 42 is electrically connected to temperature measuring head 41.

Machine body 1 comprises backrest 11, wherein each of two sides of backrest 11 is provided with armrest 12. Temperature measuring head 41 can only be arranged on backrest 11 or only on the inner side of armrest 12, or temperature measuring heads 41 can be arranged on both backrest 11 and the inner side of armrest 12 at the same time. Since backrest 11 and the inner side of armrest 12 are close to the human body, the human temperature can be easily measured.

Temperature measuring head 41 is a non-contact infrared thermometer or a contact type electronic thermometer.

Armrest 12 is provided with fingerprint identification window 7 exposed and electrically connected to control circuit board 42. Control circuit board 42 collects and confirms the identity information of the user through fingerprint identification window 7, and records the corresponding user's temperature measurement results, so as to help to manage the temperature information of different users.

Arc portion 121 for placing a palm is provided on the front end of armrest 12, and arc portion 121 is provided with concave arc-shaped finger groove 122. A bottom of concave arc-shaped finger groove 122 is provided with exposed hole 1221 which cooperates with fingerprint identification window 7 and exposes fingerprint identification window 7. Concave arc-shaped finger groove 122 is provided in a front-to-rear direction, so that when the user sits on the toilet, his or her hand is naturally put on arc portion 121 of armrest 12, the fingers can press on fingerprint identification window 7 for collecting the fingerprint information, which is more convenient.

Armrest 12 is provided with control panel 5, wherein the control panel is electrically connected to control circuit board 42 and is used to display detection data of body temperature detection device 4. Control panel 5 can display body temperature measurement information and perform corresponding control operations. Of course, the body temperature measurement information can also be transferred to the mobile phone APP and shared on the mobile phone APP. The present invention may also use voice broadcast to output body temperature measurement information. The specific design is as follows: control circuit board 42 is electrically connected to a voice prompt module, wherein the voice prompt module includes an output speaker, and the temperature information detected by body temperature detection device 4 is broadcasted to the user through the output speaker by control circuit board 42.

The rotating device is provided between armrest 12 and control panel 5, so that the armrest and the control panel can rotate, relative to each other, at multiple angles. The user can rotate control panel 5 at multiple angles, and adjusts control panel 5 to a comfortable position according to his or her preference, thereby improving user experience.

The rotating device comprises rotating shaft body 6, the outer side of armrest 12 is provided with rotating groove 123, which is concave and fitted with rotating shaft body 6. The front part and rear part of rotating groove 123 is each provided with armrest shaft hole 124, and rotating shaft body 6 is provided with armrest rotating shafts 61, wherein armrest rotating shafts 61 are fitted with armrest shaft holes 124, so as to make rotating shaft body 6 rotate left and right relative to armrest 12. Rotating shaft body 6 is further provided with panel rotating shaft 62 perpendicular to armrest rotating shafts 61. Control panel 5 is provided with panel shaft hole 51 cooperating with panel rotating shaft 62, so as to make control panel 5 to rotate 360 degrees relative to panel rotating shaft 62. The rotating device has a simple structure and is easy to make or manufacture.

What is claimed is:

1. A toilet capable of measuring body temperature, comprising: a toilet base and a machine body with an armrest, the machine body is positioned on top of and connected to the base, wherein a toilet seat is connected to the machine body, and the toilet seat is rotatable relative to the machine body and covers the toilet base; wherein the machine body is provided with a body temperature detection device, wherein the armrest is provided with an exposed fingerprint identification window electrically connected to a control circuit board.

2. The toilet capable of measuring body temperature according to claim 1, wherein the body temperature detection device comprises a temperature measuring head exposed on the machine body, wherein the control circuit board is electrically connected to the temperature measuring head.

3. The toilet capable of measuring body temperature according to claim 2, wherein the machine body comprises a backrest, wherein each of two sides of the backrest is provided with the armrest; the temperature measuring head is arranged on the backrest or on an inner side of the armrest.

4. The toilet capable of measuring body temperature according to claim 3, wherein the temperature measuring head is a non-contact infrared thermometer or a contact type electronic thermometer.

5. The toilet capable of measuring body temperature according to claim 4, wherein an arc portion for placing a palm is provided on a front end of the armrest, and the arc portion is provided with a concave arc-shaped finger groove; a bottom of the concave arc-shaped finger groove is provided with an exposed hole which cooperates with the fingerprint identification window and exposes the fingerprint identification window.

6. The toilet capable of measuring body temperature according to claim 5, wherein the concave arc-shaped finger groove is provided in a front to rear direction.

7. The toilet capable of measuring body temperature according to claim 4, wherein the armrest is provided with a control panel, wherein the control panel is electrically connected to the control circuit board and is used to display detection data detected by the body temperature detection device.

8. The toilet capable of measuring body temperature according to claim 7, wherein a rotating device is provided between the armrest and the control panel, wherein the rotating device is configured to make the armrest and the control panel rotate relative to each other at multiple angles.

9. The toilet capable of measuring body temperature according to claim 8, wherein the rotating device comprises a rotating shaft body, an outer side of the armrest is provided with a rotating groove which is concave and fitted with the rotating shaft body;
- a front part and a rear part of the rotating groove are each provided with an armrest shaft hole, the rotating shaft body is provided with an armrest rotating shaft, wherein the armrest rotating shaft is fitted with the armrest shaft hole, so as to make the rotating shaft body rotate left and right relative to the armrest;
- the rotating shaft body is further provided with a panel rotating shaft perpendicular to the armrest rotating shaft, the control panel is provided with a panel shaft hole cooperating with the panel rotating shaft, so as to make the control panel rotate 360 degrees relative to the panel rotating shaft.

10. The toilet capable of measuring body temperature according to claim 3, wherein an arc portion for placing a palm is provided on a front end of the armrest, and the arc portion is provided with a concave arc-shaped finger groove; a bottom of the concave arc-shaped finger groove is provided with an exposed hole which cooperates with the fingerprint identification window and exposes the fingerprint identification window.

11. The toilet capable of measuring body temperature according to claim 10, wherein the concave arc-shaped finger groove is provided in a front to rear direction.

12. The toilet capable of measuring body temperature according to claim 3, wherein the armrest is provided with a control panel, wherein the control panel is electrically connected to the control circuit board and is used to display detection data detected by the body temperature detection device.

13. The toilet capable of measuring body temperature according to claim 12, wherein a rotating device is provided between the armrest and the control panel, wherein the rotating device is configured to make the armrest and the control panel rotate relative to each other at multiple angles.

14. The toilet capable of measuring body temperature according to claim 13, wherein the rotating device comprises a rotating shaft body, an outer side of the armrest is provided with a rotating groove which is concave and fitted with the rotating shaft body;
- a front part and a rear part of the rotating groove are each provided with an armrest shaft hole, the rotating shaft body is provided with an armrest rotating shaft, wherein the armrest rotating shaft is fitted with the armrest shaft hole, so as to make the rotating shaft body rotate left and right relative to the armrest;
- the rotating shaft body is further provided with a panel rotating shaft perpendicular to the armrest rotating shaft, the control panel is provided with a panel shaft hole cooperating with the panel rotating shaft, so as to make the control panel rotate 360 degrees relative to the panel rotating shaft.

* * * * *